United States Patent
Son (10) Patent No.: US 10,030,632 B2
(45) Date of Patent: Jul. 24, 2018

(54) CONTROL DEVICE FOR VOLTAGE SOURCE CONVERTER AND OPERATING METHOD THEREOF

(71) Applicant: LSIS CO., LTD., Anyang-si, Gyeonggi-do (KR)

(72) Inventor: Gum Tae Son, Seoul (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 379 days.

(21) Appl. No.: 14/589,806

(22) Filed: Jan. 5, 2015

(65) Prior Publication Data

US 2015/0260161 A1 Sep. 17, 2015

(30) Foreign Application Priority Data

Mar. 17, 2014 (KR) ........................ 10-2014-0030951

(51) Int. Cl.
*F03D 7/06* (2006.01)
*H02J 3/38* (2006.01)
*H02J 3/40* (2006.01)

(52) U.S. Cl.
CPC ............... *F03D 7/06* (2013.01); *H02J 3/386* (2013.01); *H02J 3/40* (2013.01); *Y02E 10/763* (2013.01)

(58) Field of Classification Search
CPC .... F03D 7/06; H02J 3/40; H02J 3/386; Y02E 10/763
See application file for complete search history.

(56) References Cited

U.S. PATENT DOCUMENTS

| 8,305,778 B2 | 11/2012 | Jiang-Hafner |
| 8,489,247 B1* | 7/2013 | Engler .................... F01D 17/24 700/287 |
| 8,796,884 B2* | 8/2014 | Naiknaware ........ H02M 7/4807 307/102 |
| 2007/0063677 A1* | 3/2007 | Schauder .................. H02P 9/42 322/29 |
| 2008/0304188 A1 | 12/2008 | Ichinose et al. |

(Continued)

FOREIGN PATENT DOCUMENTS

| CN | 101479910 | 7/2009 |
| CN | 101610002 | 12/2009 |

(Continued)

OTHER PUBLICATIONS

European Patent Office Application Serial No. 15159003.1, Search Report dated Jul. 20, 2015, 5 pages.

(Continued)

*Primary Examiner* — Jared Fureman
*Assistant Examiner* — Emmanuel R Dominique
(74) *Attorney, Agent, or Firm* — K&L Gates LLP (57) ABSTRACT

A control device for a voltage source converter connected to a wind farm is provided. The control device includes: a power source monitor unit sensing a direct current (DC) voltage of a whole grid connected to the voltage source converter; and a control unit comparing the DC voltage of the whole grid sensed with a reference voltage, wherein the control unit adjusts an alternating current (AC) supplying to the wind farm to a setting when as a result of comparison, the DC voltage of the whole grid sensed is out of a preset range of reference voltages.

6 Claims, 8 Drawing Sheets

(56) References Cited

U.S. PATENT DOCUMENTS

| | | | | |
|---|---|---|---|---|
| 2009/0281675 | A1* | 11/2009 | Rasmussen | F03D 7/047 700/287 |
| 2010/0109328 | A1* | 5/2010 | Li | H02M 7/53875 290/44 |
| 2010/0157632 | A1* | 6/2010 | Batten | H02M 7/4807 363/74 |
| 2010/0198421 | A1* | 8/2010 | Fahimi | H02J 3/32 700/291 |
| 2011/0140438 | A1 | 6/2011 | Delmerico et al. | |
| 2012/0300510 | A1* | 11/2012 | Jensen | H02J 3/36 363/35 |

FOREIGN PATENT DOCUMENTS

| | | |
|---|---|---|
| CN | 101682192 | 3/2010 |
| CN | 1022996774 | 12/2011 |
| CN | 102801176 | 11/2012 |
| EP | 2528184 | 11/2012 |
| JP | 2-114829 | 4/1990 |
| JP | 2001333587 | 11/2001 |
| JP | 2004-194417 | 7/2004 |
| JP | 2005-137163 | 5/2005 |
| JP | 2009-239990 | 10/2009 |

OTHER PUBLICATIONS

Japan Patent Office Application Serial No. 2015-020922, Office Action dated Mar. 1, 2016, 2 pages.

The State Intellectual Property Office of the People's Republic of China Application Serial No. 201510117165.1, Office Action dated Nov. 22, 2016, 8 pages.

State Intellectual Property Office of the People's Republic of China Application Serial No. 201510117165.1, Office Action dated Jul. 18, 2017, 9 pages.

* cited by examiner

CONTROL DEVICE FOR VOLTAGE SOURCE CONVERTER AND OPERATING METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2014-0030951, filed on Mar. 17, 2014, the contents of which are hereby incorporated by reference herein in its entirety.

BACKGROUND

The present disclosure relates to a control device for a voltage source converter and an operating method thereof, and more particularly, to a control device for a voltage source converter associated with a wind farm and an operating method thereof.

In general, a high voltage direct current (HVDC) is associated with an HVDC transmission method in which alternating current (AC) power generated in a power station is converted into DC power, the DC power is transmitted and then re-converted into the AC power in a power receiving region.

Since the HVDC is high in power transmission efficiency and low in power loss, all the countries of the world are widely utilizing it from high voltage power transmission to distribution.

In recent, wind power and solar light are recognized as essential technologies for the reduction of a greenhouse gas and expansion in the distribution of new renewable energy and thus an interest in the HVDC is increasing.

Also, the HVDC is being recognized as a core technology in the power industry field of a country due to a high ripple effect throughout related fields such as semiconductor power electronics, computer, control, communication, electricity, machine design, and analysis engineering.

Such an HVDC system is classified into a current type HVDC system using a thyristor valve and a voltage source converter (VSC) based HVDC system using an insulated gate bipolar mode transistor (IGBT) element.

Since the VSC based HVDC may supply active power and reactive power, it is also suitable for small isolated grid connection having no separate power supply, and since the VSC based HVDC has a smaller conversion station in comparison to the current type HVDC and may implement a black start function, it is suitable for marine platform having no AC power supply.

Due to the advantages of the VSC based HVDC, a plan and project for connecting a remote, new renewable energy farm by using the VSC based HVDC are increasing.

When in a general multi-terminal DC transmission device, an AC grid and a wind farm are together connected, they are controlled by a remote control 500.

Figure 1:
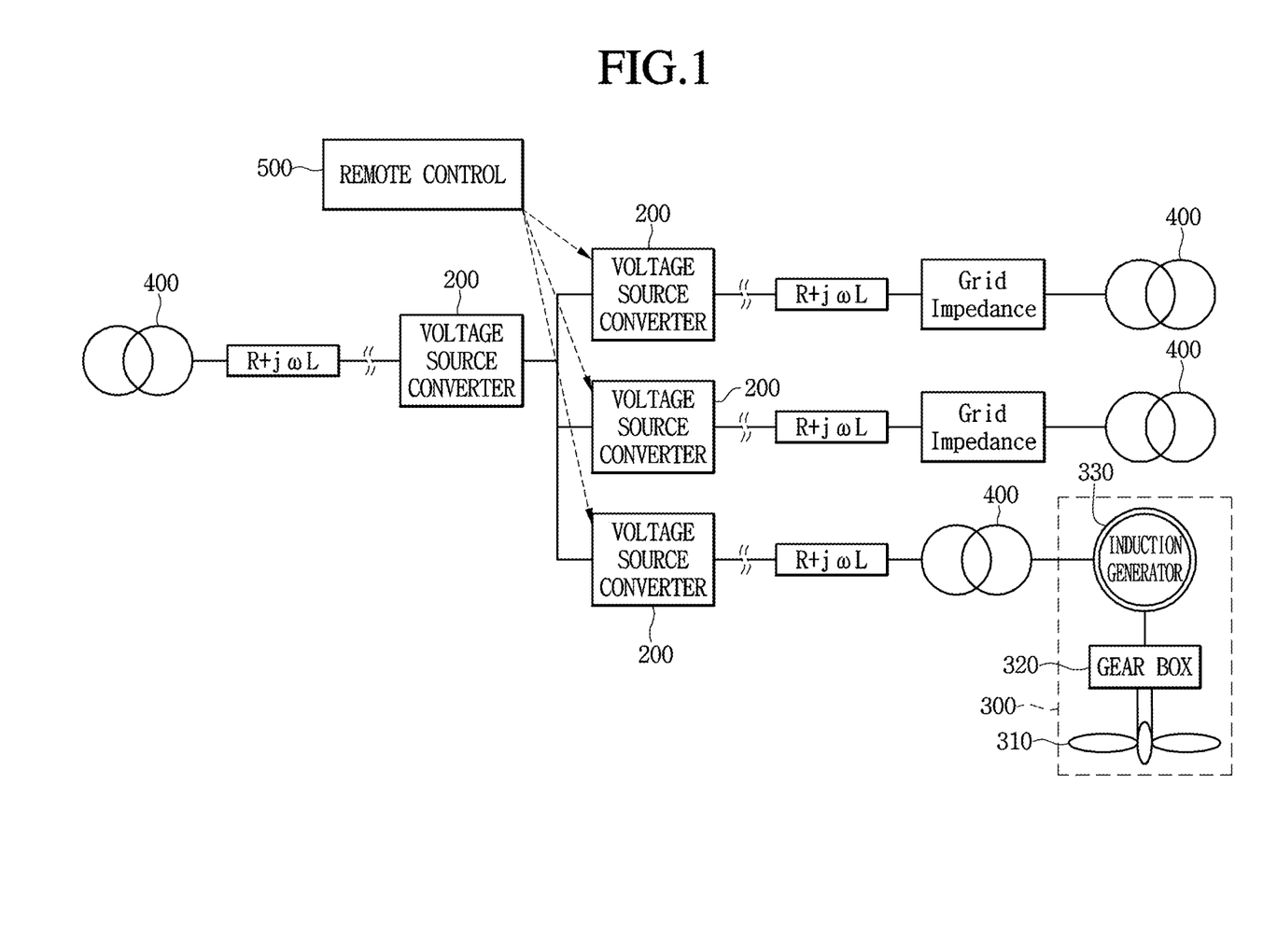
FIG. 1 is a schematic diagram of a general multi-terminal direct current (DC) transmission device.

Related descriptions are provided with reference to FIG. 1.

FIG. 1 is a schematic diagram of a general multi-terminal DC transmission device.

The multi-terminal DC transmission device in FIG. 1 is a system having four terminals, each being connected to an AC grid connected to a transformer 400 or a wind farm 300.

In addition, there are line impedance R+jwL and grid impedance between a voltage source converter 200 and the AC grid.

Each terminal includes the voltage source converter 200 and is controlled by the remote control 500.

Since the remote control 500 is spaced apart from each voltage source converter 200, it may control each voltage source converter 200 through communication.

When the remote control 500 connected to each voltage source converter 200 experiences communication failure, the remote control 500 may not control each voltage source converter 200 and one or more voltage source converters 200 does not normally operate, each voltage source converter 200 is in a backup operation mode.

Thus, each voltage source converter 200 operates a backup controller such as a droop controller so that the power transmission of a whole DC transmission system is consistently performed.

However, when the voltage source converter 200 may not communicate with the wind farm 300, the power transmission control from the voltage source converter 200 connected to the wind farm may not normally operate.

The reason for this is because the control of a general wind power generator is performed by a using maximum power point tracking (MPPT) technique, a whole DC transmission device experiences an excessive power supply, the common DC bus voltage of the multi-terminal DC transmission device rises and thus there is a limitation in that the continuous operation of a DC transmission device becomes difficult.

SUMMARY

Embodiments provide a control device for a voltage source converter that enables the continuous power transmission of a voltage source DC transmission device connected to a wind farm, and an operating method thereof.

In one embodiment, a control device for a voltage source converter connected to a wind farm includes: a power source monitor unit sensing a direct current (DC) voltage of a whole grid connected to the voltage source converter; and a control unit comparing the DC voltage of the whole grid sensed with a reference voltage, wherein the control unit adjusts an alternating current (AC) supplying to the wind farm to a setting when as a result of comparison, the DC voltage of the whole grid sensed is out of a preset range of reference voltages.

The setting may include a frequency of the AC voltage to be adjusted and a level of the AC voltage to be adjusted.

The control device may adjust the AC voltage to the setting to decrease the frequency and level of the AC voltage supplied to the wind farm and decrease power generation of the wind farm receiving the AC voltage adjusted.

The control unit may include: a voltage comparison unit 121 comparing the DC voltage of the whole grid sensed with the reference voltage, a frequency control unit 122 adjusting a frequency of the AC voltage to the setting depending on a comparison result, a voltage level control unit 123 adjusting a level of the AC voltage based on the frequency of the AC voltage adjusted, and a phase control unit 124 adjusting a phase of the AC voltage based on the frequency of the AC voltage adjusted.

The voltage level control unit may adjust a level of the AC voltage to a level of an AC voltage corresponding to the frequency of the AC voltage adjusted according to a constant V/f control technique.

The details of one or more embodiments are set forth in the accompanying drawings and the description below.

Other features will be apparent from the description and drawings, and from the claims.

DETAILED DESCRIPTION OF THE EMBODIMENTS

Embodiments are described below in detail with reference to the accompanying drawings so that a person skill in the art may easily practice the embodiments. However, the present invention may be implemented in several different forms and is not limited to embodiments that are described herein. In addition, parts irrelevant to descriptions are not provided in the drawings in order to make the present invention clear and similar parts throughout the disclosure have similar reference numerals.

Also, when it is described that a part includes some elements, it should be understood that it may not exclude but further include other elements if there is no specific objection.

Before describing a control device 100 for a voltage source converter and an operating method thereof, the fundamental operation of a wind farm 300 is described with reference to FIG. 2.

Figure 2:
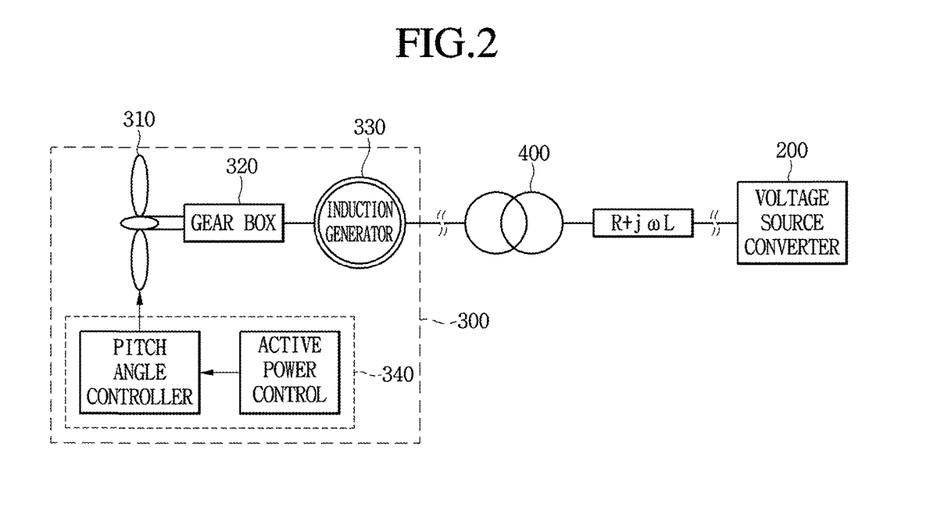
FIG. 2 represents a wind farm connected to a voltage source converter.

FIG. 2 represents the wind farm 300 connected to the voltage source converter 200.

The voltage source converter 200 is connected to the wind farm 300 through a transformer 400. In addition, there is line impedance R+jwL between the voltage source converter 200 and the transformer 400.

The wind farm 300 includes a plurality of wind power generators.

The wind power generator includes a blade 310, a gear box 320, an induction motor 330, and a control unit 340.

The blade 310 may make torque from wind.

The gear box 320 changes the rotation speed of the blade 310 to a certain value.

The induction motor 330 produces induction electricity according to the rotation of the blade 310.

The control unit 340 controls the overall operation of the wind power generator.

The wind power generation operation of the control unit 340 may be controlled in various manners.

For example, in the case of pitch angle control, the control unit 340 may control through the control of active power according to electric energy instructions.

When the AC voltage of an AC grid connected to the wind power generator has a fixed frequency and level, the power of wind power follows Equation 1 below:

$$P_{turbine} = C_p P_{wind} = \frac{1}{2} C_P \rho A v^3 \qquad \text{<Equation 1>}$$

where Cp is an power efficient and may be converted through pitch angle control.

Due to these characteristics, the frequency and level of an AC voltage affects active power.

Figure 3:
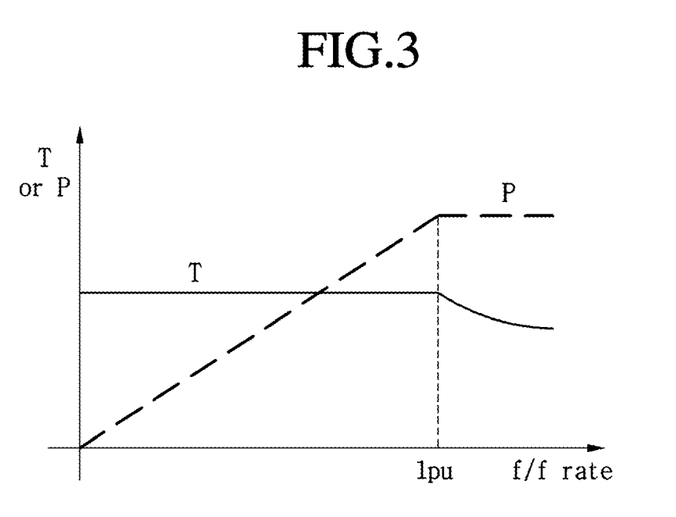
FIG. 3 is the constant V/f control characteristic curve of a general induction motor.

Related descriptions are provided with reference to FIG. 3.

FIG. 3 is the constant V/f control characteristic curve of a general induction motor.

In this example, V/f represents the ratio of voltage to frequency in size.

On the characteristic curve in FIG. 3, the X axis is a frequency value proportional to a rated frequency and the Y axis represents values for power P and torque T depending on constant V/f control.

As shown in FIG. 3, when a frequency is higher than 1 pu, the power P of the induction motor is constant and when the frequency is lower than 1 pu, the torque T is maintained. Thus, there is a characteristic that power P also decreases with a decrease in frequency.

Since the characteristic of a general induction motor is known, a detailed description is not provided.

The control device 100 of the voltage source converter and the operating method thereof are described below with reference to the above-described contents.

The control device 100 for the voltage source converter and the voltage source converter 200 are described with reference to FIGS. 4 and 5.

Figure 4:
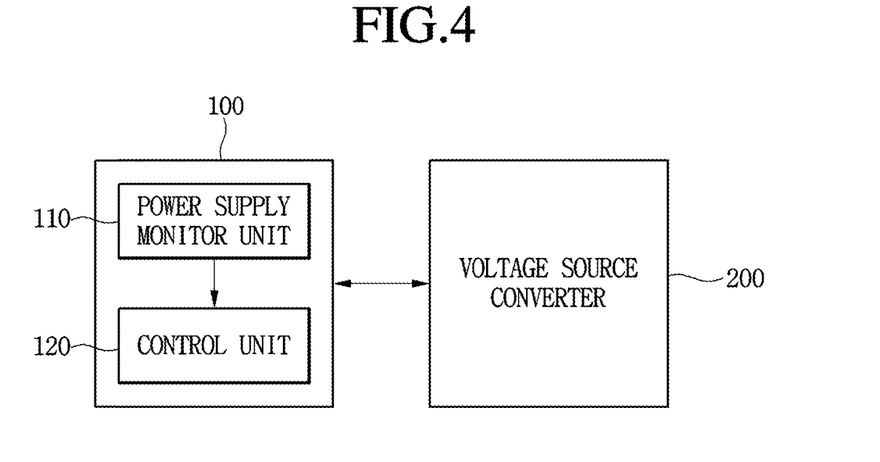
FIG. 4 is a block diagram of a control device for a voltage source converter according to an embodiment.

FIG. 4 is a block diagram of the control device 100 for the voltage source converter.

Figure 5:
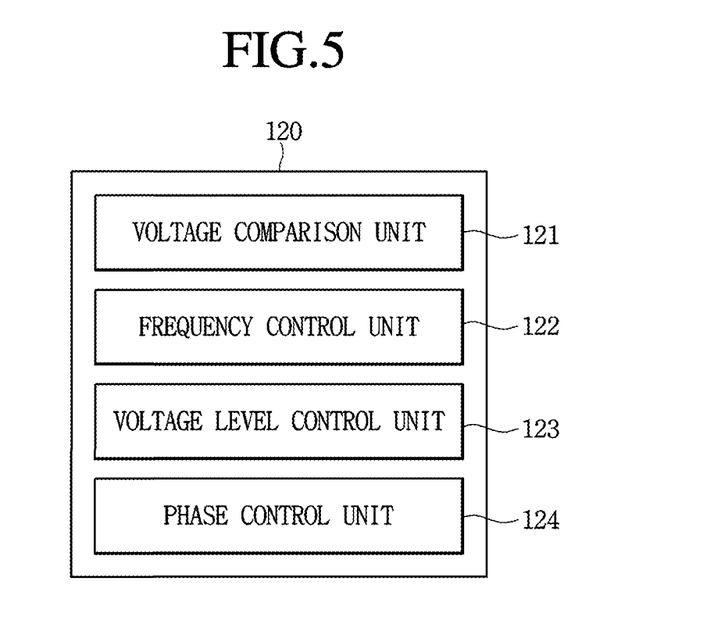
FIG. 5 is a block diagram of a control unit according to an embodiment.

FIG. 5 is a block diagram of a control unit 120 of the control device 100.

The control device 100 for the voltage source converter controls a connected voltage source converter 200.

The voltage source converter 200 uses an insulated gate bipolar transistor (IGBT) to convert a direct current (DC) into an alternating current (AC) or vise versa.

The control device 100 for the voltage source converter includes a power source monitor unit 110 and the control unit 120.

The power source monitor unit 110 senses the DC voltage of a whole grid connected to the voltage source converter 200. Thus, the power source monitor unit 110 may measure the DC voltage of the whole grid.

The power source monitor unit 110 transmits the DC voltage of the whole grid measured to the control unit 120.

The control unit 120 controls the operation of the voltage source converter 200.

The control unit 120 may control a conversion operation between a DC and an AC that is performed by the voltage source converter 200.

For example, the control unit 120 may control one or more of the level of a DC voltage, the frequency of an AC voltage, the level of the AC voltage, and the phase of the AC voltage in conversion operation between the DC and the AC by the voltage source converter 200.

Thus, the control unit 120 may adjust one or more of the level of a DC voltage, the frequency of an AC voltage, the level of the AC voltage, and the phase of the AC voltage to particular settings in conversion operation between the DC and the AC by the voltage source converter 200.

Also, the control unit 120 may receive the control signal of the remote control 500 through communication.

In particular, the control unit 120 includes a voltage comparison unit 121, a frequency control unit 122, a voltage level control unit 123, and a phase control unit 124.

The comparison unit 121 compares the DC voltage of the whole grid measured with a reference voltage.

The frequency control unit 122 adjusts the frequency of an AC voltage depending on the comparison of the reference voltage with the DC voltage of the whole grid measured of the voltage comparison unit 121 and transmits a frequency control signal.

The voltage level control unit 123 calculates the level of an AC voltage corresponding to the control signal of the frequency control unit 122 and adjusts the level of an AC voltage output by the voltage source converter 200 to the level of a calculated AC voltage.

The phase control unit 124 adjusts the phase of an AC voltage output by the voltage source converter 200 in response to the control signal of the frequency control unit 122.

The operating method of the control device 100 of the voltage source converter 200 is described with reference to FIG. 6.

Figure 6:
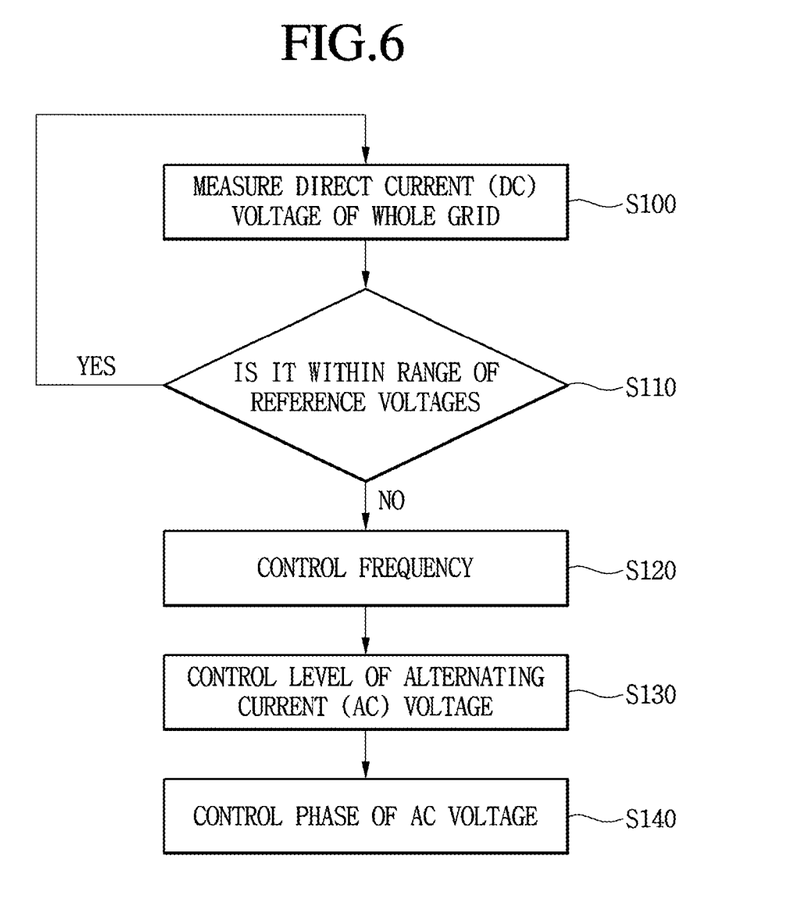
FIG. 6 is a flowchart of an operating method of a control device for a voltage source converter according to an embodiment.

FIG. 6 is a block diagram of the control device 100 for the voltage source converter.

The power source monitor unit 110 of the control device 100 measures the DC voltage of a connected whole grid in step S100.

The DC voltage of the whole grid measured by the power source monitor unit 110 is transmitted to the control unit 120.

The control unit 120 of the control device 100 determines whether the measured DC voltage is within a preset range of reference voltages in step S110.

The voltage comparison unit 121 of the control unit 120 may compare the measured DC voltage with the reference voltage to determine whether the measured DC voltage is within a preset range of reference voltages.

For example, when the reference voltage is about 1000 V and the preset range is about 900 V to 1100 V, the voltage comparison unit 121 may determine that the measured DC voltage is within the preset range of reference voltages if it is 950 V. However, when the measured DC voltage is 1300 V, the voltage comparison unit 121 may determine that the measured DC voltage is not within the preset range of reference voltages.

In this example, the reference voltage and the preset range of reference voltages may vary depending on the configuration, design, and operation of a whole grid.

The control unit 120 may determine whether the DC voltage measured by the power source monitor unit 110 is within the preset range of reference voltages, when the control signal of the remote control 500 is not transmitted to the control device 100 due to communication failure or error between the remote control 500 and the control device 100.

The control unit 120 adjusts the frequency of the AC voltage of the voltage source converter 200 to a setting when the measured DC voltage is not within the preset range of reference voltages, in step S120.

For example, when the DC voltage of a connected whole grid is not within a range of reference voltages and it is impossible to receive the control signal of the remote control 500, the control unit 120 may allow the voltage source converter 200 to decrease the size of the frequency of the AC voltage supplying to the wind farm 300 to a setting.

In this example, the setting may vary depending on the configuration, design and operation of a whole grid.

Figure 7:
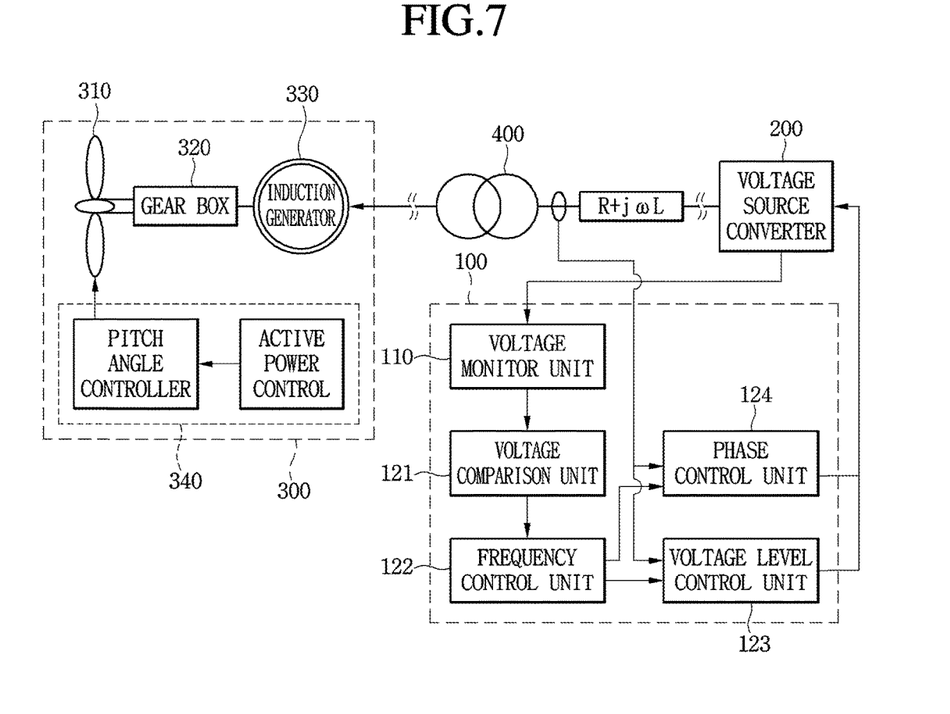
FIGS. 7 and 8 are conceptual diagrams representing how a control device for a voltage source converter according to an embodiment controls the voltage source converter.

Related descriptions are provided with reference to FIG. 7.

FIG. 7 is a conceptual diagram representing how the control device 100 controls the voltage source converter 200.

As shown in FIG. 7, the power source monitor unit 110 of the control device 100 measures the DC voltage of a whole grid.

In addition, the voltage comparison unit 121 compares the DC voltage of the whole grid measured with a reference voltage and determines whether the DC voltage of the whole grid measured is within a range of reference voltages.

When as a result of comparison by the voltage comparison unit 121, the DC voltage of the whole grid measured is not within the range of reference voltages, the frequency control unit 122 adjusts the frequency of the output AC voltage of the voltage source converter 200 to a setting and transmits a frequency control signal for an adjusted frequency.

The frequency control signal transmitted by the frequency control unit 122 may also include information on a setting that is the frequency value of an AC voltage to be adjusted.

Thus, when the frequency control unit 122 transmits a frequency control signal decreasing the frequency of an AC voltage, the frequency control signal may also include the frequency value of an AC voltage to be adjusted.

In addition, the frequency control signal transmitted by the frequency control unit 122 is transmitted to the voltage level control unit 123 and the phase control unit 124.

As an example, the frequency control unit 122 may transmit a frequency signal that decreases the current frequency 60 Hz of an output AC voltage of the voltage source converter 200 to the setting 30 Hz and the frequency of the output AC voltage to 30 Hz.

How much the frequency control unit 122 decreases the frequency of the AC voltage may vary depending on the level of the DC voltage of the whole grid measured and on the configuration, design and operation of the whole grid.

The control unit 120 returns to step S100 when as a result of determination in step S110, the measured DC voltage is within in a preset range of reference voltages.

The operating method of the control device 100 of the voltage source converter 200 continues to be described with reference to FIG. 6.

The control unit 120 of the control device 100 adjusts the level of an output AC voltage of the voltage source converter 200 to the level of an AC voltage corresponding to an adjusted frequency in step S130.

The voltage level control unit 123 of the control device 100 may use a constant V/f control technique that slightly affects the insulation of the induction motor 330 of a wind power generator in the wind farm 300, the voltage source converter 200, and a transformer connected to the voltage source converter 200.

Thus, the voltage level control unit 123 of the control unit 120 may adjust the level of the output AC voltage of the voltage source converter 200 depending on the frequency control signal transmitted in step S120.

For example, when before the adjusting of a frequency, the level of the output AC voltage is about 220 V and the frequency is about 60 Hz, the voltage level control unit 123 may allow the voltage source converter 200 to adjust the level of the output AC voltage to about 110 V if the frequency of the output AC voltage adjusted is about 30 Hz.

The voltage level control unit 123 may use a proportional integral control technique to control the level of the output AC voltage based on the level of an AC voltage currently measured and the level of an AC voltage to be adjusted.

Thus, the voltage level control unit 123 may adjust the level of the AC voltage currently measured to be close to the level of the AC voltage to be adjusted through feedback control that compares and adjusts the level of the AC voltage currently measured with the level of the AC voltage to be adjusted.

Since the proportional integral control technique is a known technique and a voltage level adjustment through the proportional integral control technique is also a known technique, related detailed descriptions are not provided.

The control unit 120 of the control device 100 adjusts the phase of an output AC voltage of the voltage source converter 200 to the phase of an AC voltage corresponding to an adjusted frequency in step S140.

Since the voltage source converter 200 also functions as an inverter, the control device 100 may also control the phase of the output AC voltage of the voltage source converter 200.

Thus, the phase control unit 124 of the control unit 120 may adjust the phase of the output AC voltage based on the phase of the current AC voltage and the phase of an AC voltage corresponding to an AC voltage to be adjusted depending on a frequency control signal.

The phase control unit 124 may calculate the phase of the output AC voltage of the voltage source converter based on the frequency of the AC voltage adjusted and adjust the phase of an AC voltage to the phase of a calculated AC voltage based on the phase angle of the current output AC voltage.

Through the above-described processes, the control unit 120 of the control device 100 may allow the voltage source converter 200 to output an AC voltage having an adjusted voltage level and an adjusted frequency.

Thus, the wind farm 300 connected to the voltage source converter 200 receives an AC voltage having an adjusted frequency and an adjusted level.

For example, since the wind farm 300 may receive an AC voltage having a lower frequency and a smaller level than before the adjustment, the torque T of the induction motor 33 is constant according to the characteristic curve of the induction motor shown in FIG. 2 but the power P generation of the wind farm 300 decreases.

Thus, it is possible to prevent the wind farm 300 connected to a multi-terminal type DC transmission device from supplying excessive power to a whole DC grid.

Thus, even if there is communication failure between the wind farm 300 and the voltage source converter 200 and an AC grid has a problem, the multi-terminal type DC transmission device may normally operate.

In this example, the matter that the torque T of the wind power generator of the wind farm 300 is constant but the power P generation decreases has been on the related section of FIGS. 2 and 3.

Then, an embodiment of the control operation of the control device of the voltage source converter is described with reference to FIG. 8.

Figure 8:
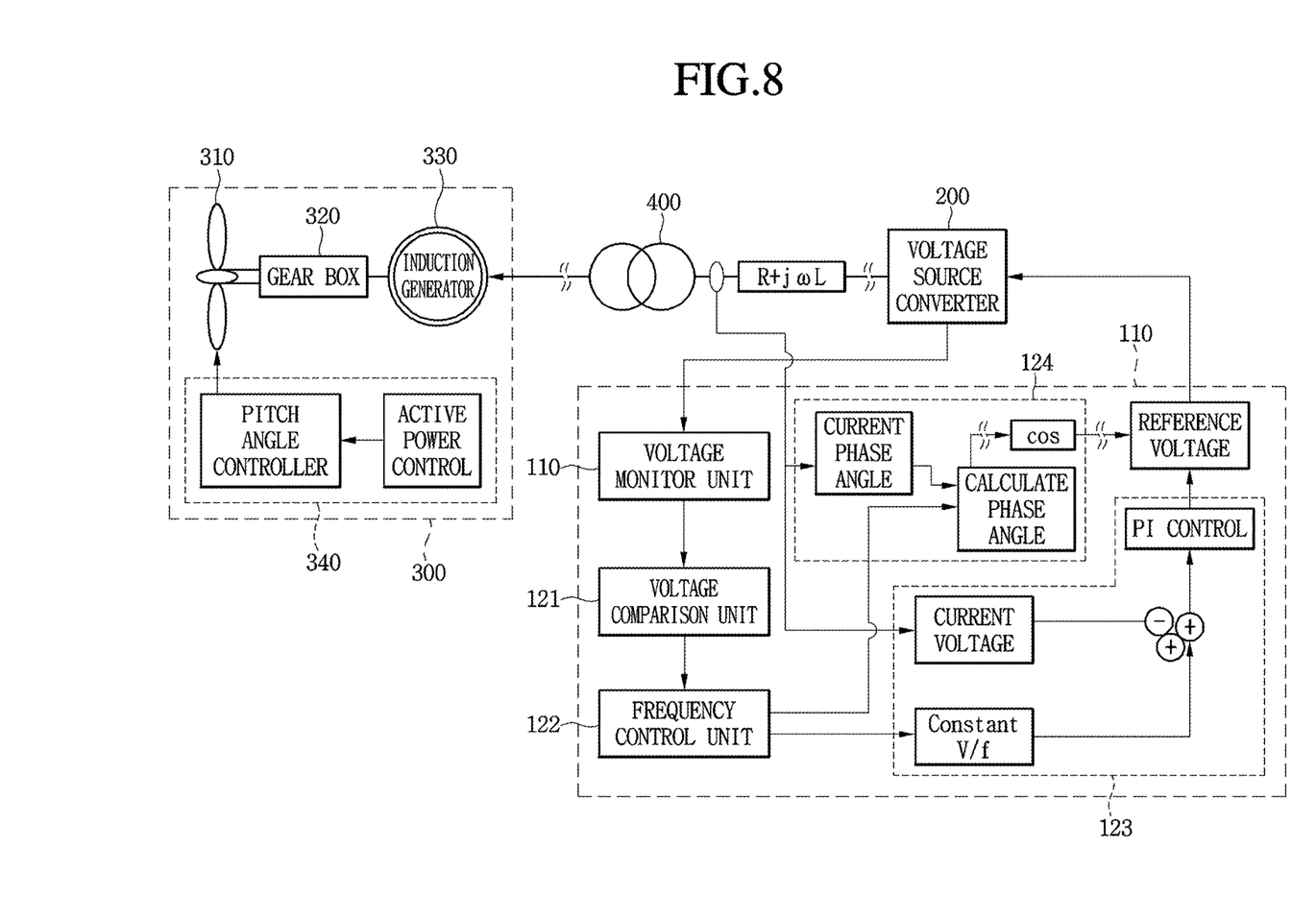

FIG. 8 is a conceptual diagram representing how the control device 100 controls the voltage source converter 200 and represents the particular operation of the control device 100.

As shown in FIG. 8, the power source monitor unit 110 of the control device 100 measures the DC voltage of a whole grid.

In addition, the voltage comparison unit 121 compares the DC voltage of the whole grid measured with a reference voltage and determines whether the DC voltage of the whole grid measured is within a range of reference voltages.

When as a result of comparison by the voltage comparison unit 121, the DC voltage of the whole grid measured is not within the range of reference voltages, the frequency control unit 122 adjusts the frequency of the output AC voltage of the voltage source converter 200 to a setting.

In addition, the frequency control signal transmits a frequency control signal to the voltage level control unit 123 and the phase control unit 124.

Thus, the voltage level control unit 123 of the control unit 120 may adjust the level of the output AC voltage of the voltage source converter 200 depending on a received frequency control signal.

In particular, the voltage level control unit 123 calculates the level of an AC voltage corresponding to the size of a frequency to be adjusted according to a constant V/f control technique.

The voltage level control unit 123 adjusts the level of the current AC voltage to the level of a calculated AC voltage through a proportional integral control technique.

A signal used for adjusting the level of an output AC voltage to the level of a calculated AC voltage by the voltage level control unit 123 is transmitted to the voltage source converter 200 with a reference voltage type signal.

The reference voltage may be a control signal transmitted to the voltage source converter 200 and represented by $m\cos(2\pi f+\varphi)$.

In this example, m represents the modulation index of the output AC voltage of the voltage source converter 200 and $2\pi f+\varphi$ represents the phase of the output AC voltage.

In addition, the voltage source converter 200 receiving a signal for a reference voltage may output an output AC voltage corresponding to the reference voltage.

In this example, a technique in which the reference voltage is transmitted to the voltage source converter 200 may be selected from various techniques such as a pulse width modulation technique and modular multi-level converter control technique.

The phase control unit 124 may adjust the phase of an output AC voltage to the phase of an AC voltage corresponding to a received frequency control signal based on the phase angle of the AC voltage currently measured.

In particular, the phase control unit 124 may calculate the phase angle of an AC voltage to be adjusted based on the phase angle of an AC voltage currently measured and the frequency of the AC voltage to be adjusted and reflect a calculated phase angle φ to the phase of the above-described reference voltage $m\cos(2\pi f+\varphi)$ through a cosine function.

Thus, the phase of the output AC voltage of the voltage source converter 200 is adjusted depending on information on the phase of an AC voltage in a signal for a reference voltage.

Through the above-described processes, the control unit 120 of the control device 100 may allow the voltage source converter 200 to output an AC voltage having an adjusted voltage level and an adjusted frequency.

As such, according to the control device 100 of the voltage source converter of an embodiment, when a DC transmission device system connected to a wind farm has a communication problem, it is possible to adjust the output AC voltage of the voltage converter and thus prevent the shut down of the wind farm.

Thus, since continuous power transmission through the DC transmission device system connected to the wind farm is possible, it is possible to stabilize the operation of a whole power grid.

The characteristics, structures, and effects described in the embodiments above are included in at least one embodiment but are not limited to one embodiment. Furthermore, the characteristic, structure, and effect illustrated in each embodiment may be combined or modified for other embodiments by a person skilled in the art. Thus, it would be construed that contents related to such a combination and such a variation are included in the scope of the present invention.

Embodiments are mostly described above. However, they are only examples and do not limit the present invention. A person skilled in the art may appreciate that many variations and applications not presented above may be made without departing from the essential characteristic of embodiments. For example, each component particularly represented in embodiments may be varied. In addition, it should be construed that differences related to such a variation and such an application are included in the scope of the present invention defined in the following claims.

What is claimed is:

1. A control device to communicate with a remote control for a voltage source converter connected to a wind farm connected to a whole grid, wherein the wind farm includes a plurality of wind power induction generators that generate power that is generated as a function of torque of each of the induction generators, and frequency and level of alternating current (AC) voltage received at each of the induction generators, the control device comprising:
    a power source monitor unit sensing a direct current (DC) voltage of the whole grid connected to the voltage source converter; and
    a control unit configured to:
    compare the sensed DC voltage of the whole grid with a reference voltage when a control signal of the remote control is not transmitted to the control device due to communication failure or error between the remote control and the control device, and
    adjust the frequency and the level of the AC voltage supplied to each of the induction generators of the wind farm to a relatively lower frequency and level of AC voltage to cause a corresponding decrease in the power generated by the wind farm, when the sensed DC voltage of the whole grid is outside of a preset range of reference voltages.

2. The control device according to claim 1, wherein the control unit comprises:
    a voltage comparison unit comparing the sensed DC voltage of the whole grid with the reference voltage,
    a frequency control unit adjusting the frequency of the AC voltage depending on the comparing,
    a voltage level control unit adjusting the level of the AC voltage based on the adjusted frequency of the AC voltage, and
    a phase control unit adjusting a phase of the AC voltage based on the adjusted frequency of the AC voltage.

3. The control device according to claim 2, wherein the voltage level control unit adjusts the level of the AC voltage to a level corresponding to the adjusted frequency of the AC voltage according to a constant V/f control technique.

4. A method for using a control device to communicate with a remote control for a voltage source converter connected to a wind farm connected to a whole grid, wherein the wind farm includes a plurality of wind power induction generators that generate power that is generated as a function of torque of each of the induction generators, and frequency and level of alternating current (AC) voltage received at each of the induction generators, the method comprising:
    sensing a direct current (DC) voltage of the whole grid connected to the voltage source converter;
    comparing the sensed DC voltage of the whole grid with a reference voltage when a control signal of the remote control is not transmitted to the control device due to communication failure or error between the remote control and the control device; and
    adjusting the frequency and the level of AC voltage supplied to each of the induction generators of the wind farm to a relatively lower frequency and level of AC voltage to cause a corresponding decrease in the power generated by the wind farm, when the sensed DC voltage of the whole grid is outside of a preset range of reference voltages.

5. The method according to claim 4, further comprising:
    comparing the sensed DC voltage of the whole grid with the reference voltage,
    adjusting the frequency of the AC voltage depending on the comparing,
    adjusting the level of the AC voltage based on the adjusted frequency of the AC voltage, and
    adjusting a phase of the AC voltage based on the adjusted frequency of the AC voltage.

6. The method according to claim 4, further comprising:
    adjusting the level of the AC voltage to a level corresponding to the adjusted frequency of the AC voltage according to a constant V/f control technique.

* * * * *